C. F. RUGGLES.
Improvement in Garden-Cultivators.
No. 115,526.  Patented May 30, 1871.
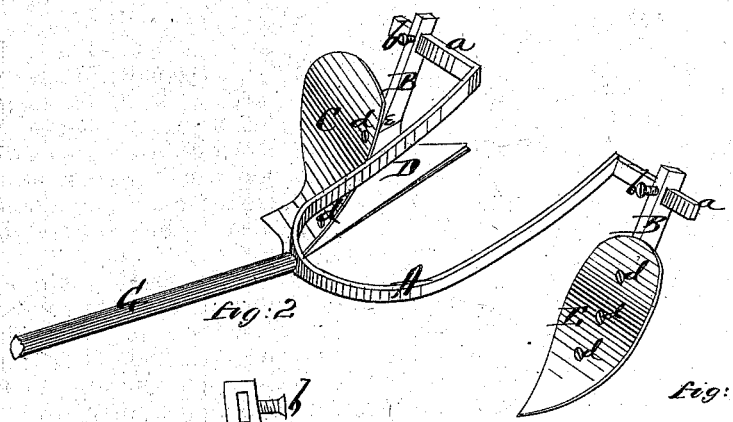

UNITED STATES PATENT OFFICE.

CALEB F. RUGGLES, OF HENDERSON, KENTUCKY.

IMPROVEMENT IN GARDEN-CULTIVATORS.

Specification forming part of Letters Patent No. 115,526, dated May 30, 1871.

*To all whom it may concern:*

Be it known that I, CALEB F. RUGGLES, of Henderson, in the county of Henderson and in the State of Kentucky, have invented certain new and useful Improvements in Garden-Cultivator; and do hereby declare that the following is a full, clear, and exact description thereof, reference being had to the accompanying drawing and to the letters of reference marked thereon making a part of this specification.

The nature of my invention consists in the construction and arrangement of a garden-cultivator, as will be hereinafter more fully set forth.

In order to enable others skilled in the art to which my invention appertains to make and use the same, I will now proceed to describe its construction and operation, referring to the annexed drawing, in which—

Figure 1 is a perspective view of my cultivator; Fig. 2 is a vertical section through the helve to which the plow is attached; and Fig. 3 is a rear view of the shovel-plow.

A represents the bar or beam to which the plows are attached. This bar is bent in the center, and the two ends running for a certain distance parallel with each other. The extreme ends are then bent outward at right angles, as shown in Fig. 1, forming supports $a\ a$ for the plows. The bar $a$ is curved, as shown, making the bent center higher than the ends in order to pass over large vegetables without injury to the tops. B represents the upright or helve, to which the plow is attached, said helve having a mortise at its upper end through which the end $a$ of the bar A is inserted, and the helve then held at any point desired by means of a thumb-screw, $b$. Below the mortise the helve graduates or diminishes in thickness, gradually giving sufficient strength to bear three bolts to attach the plow, and it has the proper curvature for attaching both shovel and mold-board. The mold-board C has the ordinary curvature, and is secured by three bolts, $d\ d$, having screw-taps on the under side. The land-side D is connected with the mold-board, and bears against a shoulder, $e$, on the side of the helve. A shovel-plow, E, is attached to a helve in the same manner, and said shovel has an inclined bar, $f$, on its under side so as to give it the proper slant or inclination. The plows being movable upon the ends of the bar A, they can be set so as to work close to or off from the row, as desired. A handle, G, is attached in the center of the bar A, as shown.

The shovel-plows are used first for cultivating the vegetables, and then the right-and-left mold-board attached by the same bolts and taps to turn earth from or to ridge up. The helves are beveled right and left so as to attach the mold-boards in proper position.

This cultivator may be applied as a field-cultivator by a slight change in the frame and adapting the plow to horse-power.

By applying two shovels to the arm and mold-board next to the frame, they will work out both sides of the row and cultivate half the middles on each side of the row.

Either double team—one horse on each side of the row—or tandem team, between two rows, may be used.

Having thus fully described my invention, what I claim as new, and desire to secure by Letters Patent, is—

The combination of the bent and curved bar A, having angular arms $a\ a$, with the mortised helves B B, which support the movable plows or shovels, and secured by the set-screws $b$, all substantially as shown and described.

In testimony that I claim the foregoing I have hereunto set my hand this 28th day of February, 1871.

CALEB F. RUGGLES.

Witnesses:
L. H. LYNE,
WM. T. BARRET.